(12) United States Patent
Dominguez et al.

(10) Patent No.: US 7,376,546 B2
(45) Date of Patent: May 20, 2008

(54) USER CONFIGURABLE ULTRA320 SCSI TARGET DEVICE SIMULATOR AND ERROR INJECTOR

(75) Inventors: Scott W. Dominguez, Colorado Springs, CO (US); Mike W. Bieker, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 201 days.

(21) Appl. No.: 10/984,287

(22) Filed: Nov. 8, 2004

(65) Prior Publication Data

US 2006/0100842 A1    May 11, 2006

(51) Int. Cl.
   *G06F 17/50* (2006.01)
   *G06F 9/44* (2006.01)
   *G06F 9/455* (2006.01)
   *G06F 13/38* (2006.01)

(52) U.S. Cl. ............... 703/20; 703/14; 703/24; 703/25; 703/26; 710/62; 710/72; 710/74

(58) Field of Classification Search .......... 703/14, 703/20, 24–26; 710/62, 72, 74
   See application file for complete search history.

(56) References Cited

U.S. PATENT DOCUMENTS

| | | | | |
|---|---|---|---|---|
| 5,640,541 A | * | 6/1997 | Bartram et al. | 703/26 |
| 5,721,880 A | * | 2/1998 | McNeill et al. | 703/25 |
| 5,794,013 A | * | 8/1998 | McBrearty | 703/27 |
| 5,881,250 A | * | 3/1999 | Young | 710/306 |
| 2003/0023791 A1 | * | 1/2003 | Suzuki et al. | 710/62 |
| 2003/0182455 A1 | * | 9/2003 | Hetzler et al. | 709/250 |
| 2003/0225564 A1 | * | 12/2003 | Zeidman | 703/23 |
| 2004/0243386 A1 | * | 12/2004 | Stolowitz et al. | 703/25 |
| 2005/0049848 A1 | * | 3/2005 | Dai | 703/24 |

OTHER PUBLICATIONS

"Information Technology—Small Computer System Interface 2". Computer & Business Equipment Manufacturers Association. Apr. 19, 1996.*
"Microsoft Computer Directory". Definitions of "Graphical User Interface" and "Ramdisk".*
Palekar et al. "Design and Implementation of a SCSI Target for Storage Area Networks" May 2001.*

* cited by examiner

*Primary Examiner*—Kamini Shah
*Assistant Examiner*—Shambhavi Patel
(74) *Attorney, Agent, or Firm*—Cochran Freund & Young LLC

(57) ABSTRACT

Disclosed is a SCSI target device simulator consisting of a personal computer, a SCSI host adapter board, and simulator software. The SCSI target device simulator is employed to test SCSI host adapter systems by simulating multiple SCSI target devices for test purposes. The simulated SCSI target devices may be configured to imitate a wide variety of different SCSI target device types, with an equally wide variety of configuration settings within a single SCSI target device type. A user may quickly create and change simulated SCSI target devices for a test system. The SCSI target device simulator may also be configured so that the simulated SCSI target devices respond in a specified manner to SCSI commands and SCSI task management commands. Controlling the simulated SCSI target device responses to SCSI commands and SCSI task management commands allows a user to easily configure and test a SCSI host adapter device for specific operational scenarios.

31 Claims, 6 Drawing Sheets

USER CONFIGURABLE ULTRA320 SCSI TARGET DEVICE SIMULATOR AND ERROR INJECTOR

BACKGROUND OF THE INVENTION a. Field of the Invention

The present invention generally pertains to computers and more particularly to simulating attached target devices in order to test host adapter devices used to manage computer interactions with attached target devices.

b. Description of the Background

Small Computer System Interface (SCSI) devices take advantage of technology which follows an industry standard defined by a family of SCSI technical specifications. The family of SCSI technical specifications defines the aspects of hardware and communication necessary for two or more SCSI devices to properly interact. The SCSI specifications define such things as cabling, physical interconnections, communication speed and width, types of SCSI messages, and many more items that are required for SCSI devices to suitably work together. The family of SCSI technical specifications has changed and progressed to match advances in computer technology. To maintain backward compatibility, newer specifications require devices to support aspects of the older specifications, such as communication speed and width, in addition to the new technology requirements. The family of SCSI technical specifications is a product of the T10 technical committee of the International Committee on Information Technology Standards (INCITS) operating under rules that are approved by the American National Standards Institute (ANSI). ANSI is the United States representative on Joint Technical Committee-1 (JTC-1) of the International Standards Organization (ISO) and the International Electrotechnical Commission (IEC). The family of SCSI technical specifications can be purchased from ANSI, 11 West 42nd Street, 13th Floor, New York, N.Y. 10036, telephone number 212-642-4900.

SCSI technology has long been used to create standard attached storage devices as well as other peripheral devices for computer systems. A computer system employs a SCSI host adapter device to manage communications and interactions with SCSI target devices. The SCSI target devices are the attached storage devices and other peripheral devices that add functionality to a computer system. Possible SCSI target devices includes, but is not limited to, hardware such as hard disk drives, CD-ROM drives, CD-RW drives, DVD-ROM drives, DVD-RW drives, magnetic tape drives, printers, and scanners. A SCSI target device supports SCSI target mode communications that allow the SCSI target device to receive and respond to SCSI commands and SCSI task management commands. A SCSI host adapter device also supports SCSI target mode communications to permit the SCSI host adapter device to identify itself on the SCSI communication bus and to respond to SCSI commands and SCSI task management commands issued by other SCSI host adapter devices attached to the SCSI communication bus. In addition to supporting SCSI target mode communications, a SCSI host adapter device also supports SCSI initiator mode communications. The SCSI initiator mode communications allow the SCSI host adapter device to issue SCSI commands and SCSI task management commands, thus allowing a SCSI host adapter device to manage SCSI target devices for integration with the overall computer system.

Typically, a device driver software program manages the communications between the computer system and the SCSI host adapter device. The device driver software program is a software program designed to be the communication interface between a computer Operating System (OS) and a hardware device such as a SCSI host adapter device. The computer operating system normally supplies software hooks to allow the device driver software program to interact with hardware devices and the computer operating system. Interactions with the computer operating system includes the ability to interact with any software programs running within the computer operating system.

The Microsoft Windows family of operating system software products are examples of computer operating systems that support device driver software programs used to interact with peripheral hardware devices. The most recent releases of the Microsoft Windows family of operating system software products includes Windows NT, Windows 2000, and Windows XP. Since the Microsoft Windows operating system products are generally backward compatible, a general reference to the Windows operating system implies references to all Microsoft supported versions of the Windows operating system. The Windows operating system is designed to enable third party software and hardware suppliers to create products that are compatible with the Windows operating system such that a computer system may be made up of hardware devices and software programs supplied by many different sources but compatible with the Windows operating system. The Windows operating system supplies many software tools to assist software programmers in creating software programs that run within the Windows operating system. The Windows registry is a data repository that allows a program to save configuration parameters and other data over computer boot cycles and between program starts and stops. The Windows registry can also be used to allow one program to store data that will is retrieved by another program.

The Windows operating system provides specific software tools for device driver programmers. In Windows terminology, a device driver is also referred to as a Windows mini-port. Typically, the hardware device manufacturer provides an Application Programmer Interface (API) that includes subroutines that assist the device driver programmer in establishing communications with a peripheral hardware device. A family of IOCTL (I/O control) subroutines are supplied by Windows to allow the device driver to communicate with the Windows operating system as well as other programs running within the Windows operating system. Microsoft Corporation is located at One Microsoft Way, Redmond, Wash. 98052-6399, and may be contacted at phone number 800-426-9400, or on the Internet at www.microsoft.com.

When developing a SCSI host adapter device and the device driver software program associated with the SCSI host adapter device, testing both the SCSI host adapter device and the device driver is necessary to guarantee proper operation. This testing is typically performed by purchasing SCSI target devices and connecting the SCSI target devices to the SCSI host adapter device computer system over the SCSI communications bus. As best as possible, the SCSI target devices are connected, disconnected, and operated in a fashion to replicate various possible real world physical configurations and operational response scenarios. To assist developers, some SCSI target device manufacturers have added a test mode to the SCSI target device in order to permit a limited ability to force SCSI target device responses necessary to more fully test a SCSI host adapter device and the associated device driver.

SUMMARY OF THE INVENTION

The present invention overcomes the disadvantages and limitations of the prior art by providing a SCSI target device simulator capable of simulating multiple SCSI target devices. The simulated SCSI target devices may be configured to imitate a wide variety of different SCSI target device types, with an equally wide variety of configuration settings within a single SCSI target device type. The SCSI target device simulator allows a user to quickly create and change simulated SCSI target devices on a test system, greatly easing physical modifications required to set up and change a real SCSI target device test system. The SCSI target device simulator may also be configured so that the simulated SCSI target devices respond in a specified manner to SCSI commands and SCSI task management commands. Controlling the simulated SCSI target device responses to SCSI commands and SCSI task management commands allows a user to easily configure and test a SCSI host adapter device for specific operational scenarios. Some real SCSI target devices allow limited control of SCSI target device responses, but the simulated SCSI target device simulator has more robust control of SCSI target device responses than the real SCSI target devices. The SCSI device simulator consists of a personal computer, a SCSI host adapter board, and simulator software, thus the cost for the many real SCSI target devices necessary to test a host adapter device is greatly reduced by using the SCSI device simulator.

An embodiment of the present invention may therefore comprise a SCSI target device simulator comprising: a simulator host adapter board that is a standard SCSI host adapter board, the simulator host adapter board supporting both SCSI initiator mode and SCSI target mode communications on one or more communication channels of the simulator host adapter board, the communication channels sending and receiving SCSI communications to and from a personal computer containing the simulator host adapter board, the simulator host adapter board having an external SCSI cable connection for connecting the simulator host adapter board to a SCSI communications bus, the SCSI communications bus consisting of one or more SCSI cables connected to external SCSI devices, the external SCSI devices sending and receiving SCSI communications to and from the simulator host adapter board over the SCSI communications bus, and the simulator host adapter board having configurable simulator host adapter board parameters for specifying SCSI communication settings; a simulator personal computer that is a standard personal computer, the simulator personal computer having an expansion slot that contains the simulator host adapter board, and the simulator personal computer having standard personal computer operating system software; and a simulator device driver that is a modified version of a standard host adapter board device driver for the simulator host adapter board, the simulator device driver modifying the standard host adapter board device driver to permit the simulator host adapter board SCSI target mode support to simulate the existence of one or more SCSI target devices, the simulator device driver containing processes that imitate the SCSI target devices as simulated target devices by automatically accepting and responding to a subset of the SCSI communications intended for the SCSI target devices, the simulator device driver supporting the SCSI communications on the communication channels of the simulator host adapter board that support both SCSI initiator mode communications and SCSI target mode communications, and the simulated target devices being defined by configurable simulated target device parameters.

An embodiment of the present invention may further comprise a method for testing SCSI host adapter devices comprising the steps of: connecting a test SCSI host adapter system to a SCSI target device simulator through a SCSI communications bus; configuring the SCSI target device simulator to simulate one or more SCSI target devices; operating the SCSI target device simulator to simulate the SCSI target devices as simulated target devices; operating the test SCSI host adapter system to perform SCSI host adapter management tasks on the simulated target devices in order to obtain actual performance results of the test SCSI host adapter system; and comparing the actual performance results of the test SCSI host adapter system against expected performance parameters of the test SCSI host adapter system to determine if the test SCSI host adapter system is operating within the expected performance parameters.

DETAILED DESCRIPTION OF THE INVENTION

Testing a SCSI host adapter device and the associated device driver is normally a very long, costly, and complicated process. Typically, the testing involves purchasing many expensive SCSI target devices, physically setting up the SCSI target device test system, and operating the test SCSI host adapter system against the SCSI target device test system. Some SCSI target devices allow a limited ability for the user to configure the SCSI target device to respond to SCSI commands and SCSI task management commands in a specified manner. For truly comprehensive testing, it may be necessary to manipulate the physical test SCSI target device system by making system configuration changes necessary to simulate various system operational scenarios, such as disconnecting target devices to simulate loss of device failures. When possible, the physical test system manipulation is combined with setting the response configuration for the SCSI target devices. In order to fully test the SCSI host adapter device and possibly the associated device driver, multiple physical SCSI target device test system configurations must be created and tested. Changing the physical SCSI target device test system configuration requires a significant amount of time to rearrange, configure, and reconnect the test system.

The SCSI target device simulator addresses many of the problems associated with traditional testing techniques. The SCSI target simulator, consisting of a personal computer, a SCSI host adapter board, and simulator software, significantly reduces the cost associated with purchasing the many expensive real SCSI target devices needed to set up a traditional test system. Since the simulated test system is configured in software, the set up is relatively quick and easy to complete. Also, SCSI target device simulator configurations can easily be saved and reloaded for future test procedures. The SCSI target device simulator provides robust control over simulated SCSI target device responses to SCSI commands and SCSI task management commands. The robust control of the simulated SCSI target device responses includes responses not physically possible using real SCSI target devices, thus permitting more thorough testing of the host adapter device and the associated device driver software than is possible with a real SCSI target device test system. With the SCSI target device simulator, switching between SCSI target device test configurations is as easy as loading a saved test configuration into the simulator software.

Figure 1:
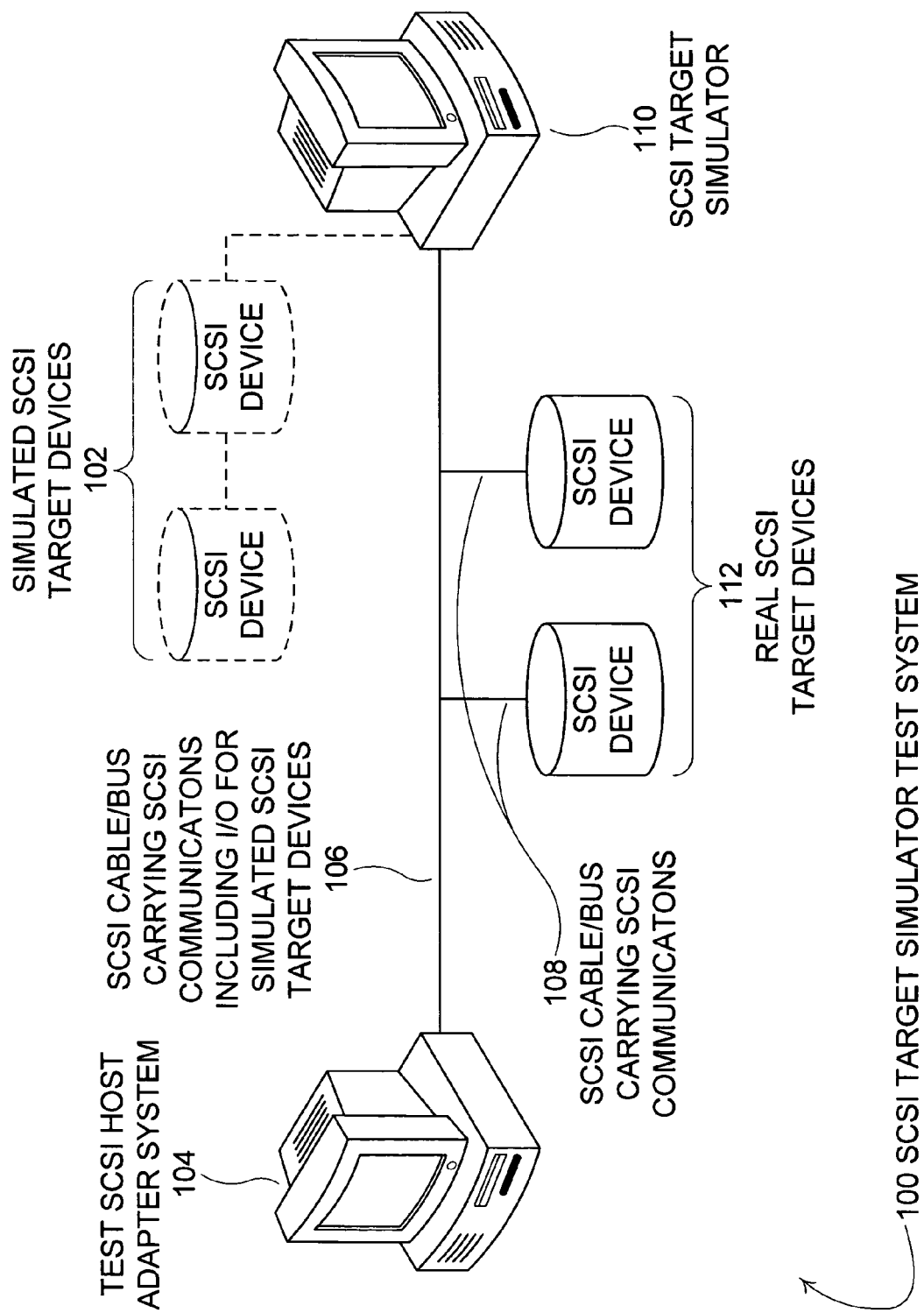
FIG. 1 is a schematic illustration of an embodiment of a SCSI target simulator test system.

FIG. 1 is a schematic illustration of an embodiment of a SCSI target simulator test system 100. The most basic embodiment of a SCSI target simulator test system 100 is made up of the test SCSI host adapter system 104 connected via a SCSI communication bus 106 to the SCSI target simulator 110. The test SCSI host adapter system 104 is made up of a computer system employing a host adapter device and a device driver to communicate on the SCSI communications bus 106. Typically, the portion of the test SCSI host adapter system 104 that is being tested is the host adapter device, and the device driver associated with the host adapter. The test SCSI host adapter system 104 may also utilize multiple host adapter devices to connect to the SCSI communication bus 106. The SCSI communication bus 106 is made up of one or more SCSI communication cables which carry SCSI communications, including SCSI Input/Output (I/O) of the SCSI target simulator 110. The SCSI target simulator 110 creates simulated SCSI target devices 102 on the SCSI communication bus 106. A more complicated embodiment of a SCSI target simulator system 100 might include connecting real SCSI target devices 112 that are connected to the SCSI communication bus 106 by additional SCSI communication bus cables 108 in order to attach to the real SCSI target devices 112. Other embodiments of a SCSI target simulator system 100 might include multiple test SCSI host adapter systems 104.

To test the test SCSI host adapter system 104 the user connects the test SCSI host adapter system 104 to the SCSI target simulator 110 through a SCSI communication bus 106. The SCSI target simulator 110 is configured to simulate one or more SCSI target devices 102. The SCSI target simulator 110 is then started and the simulated SCSI target devices 102 are available on the SCSI communication bus 106. The test SCSI host adapter system 104 is operated to perform SCSI management tasks against the simulated SCSI target devices 102. The actual performance of the test SCSI host adapter system 104 is observed and compared against expected performance parameters of the test SCSI host adapter system 104. If the actual performance results are not within the expected performance parameters modifications to one or more components of the test SCSI host adapter system 104 may be necessary. The SCSI target simulator 110 may be configured such that the simulated SCSI target devices 102 respond to specific SCSI commands and SCSI task management commands from the test SCSI host adapter system 104 with a user configured response. The ability of the SCSI target simulator 110 to control the potential responses of the SCSI target simulated devices 102 greatly enhances the test capabilities of the SCSI target simulator test system 100.

Figure 2:
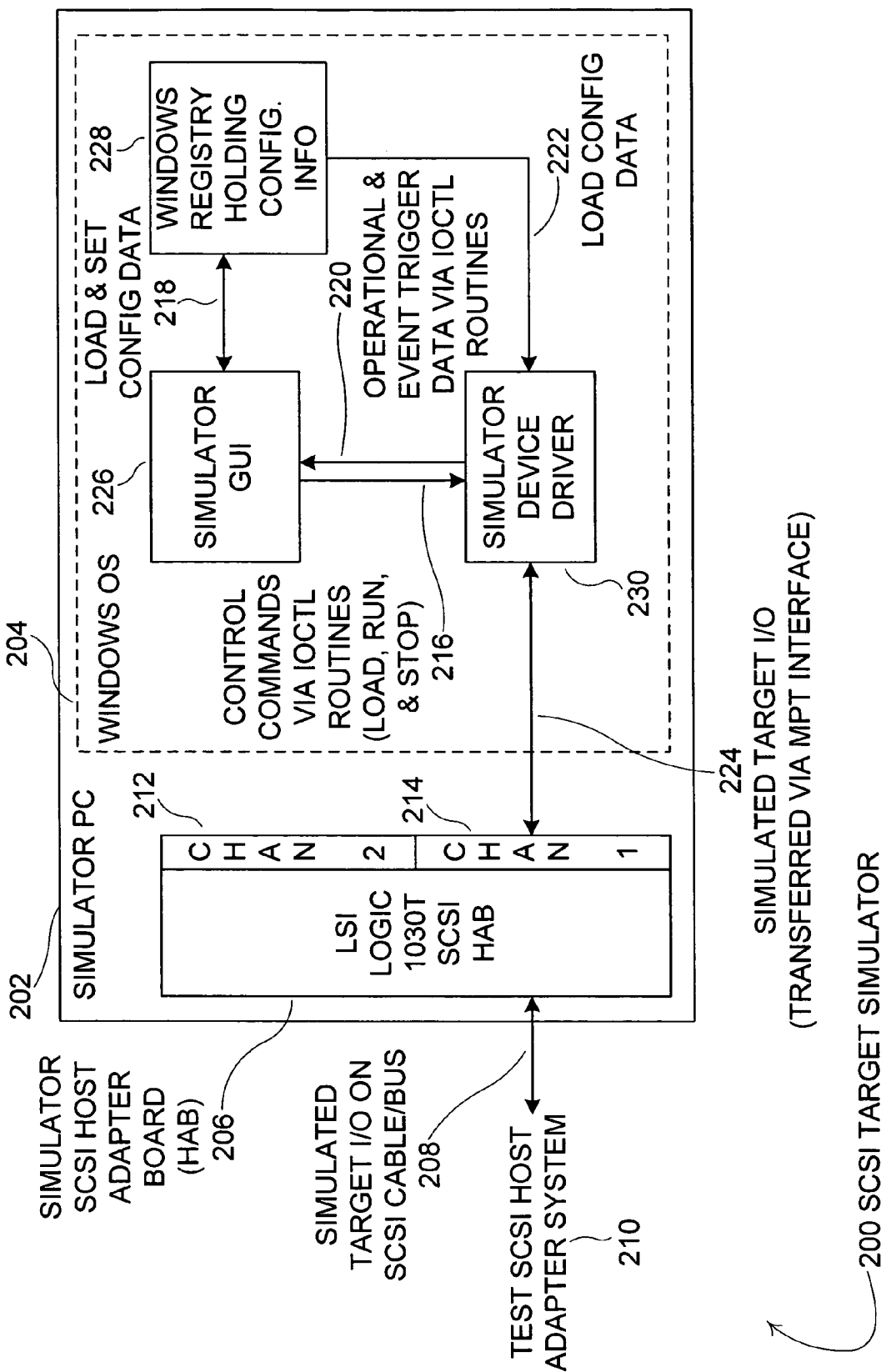
FIG. 2 is a schematic illustration of an embodiment of a SCSI target simulator.

FIG. 2 is a schematic illustration of an embodiment of a SCSI target simulator 200. A SCSI target simulator 200 is made up of a personal computer (PC) 202, a SCSI host adapter board 206, and simulator software running on the simulator personal computer 202. The simulator personal computer 202 places the simulator SCSI host adapter board 206 into a hardware expansion slot on the simulator personal computer 202. In the embodiment of the SCSI target simulator illustrated 200 the simulator SCSI host adapter board 206 is a LSI Logic 1030T SCSI host adapter board. The LSI Logic 1030T SCSI host adapter board has two internal communication channels and operates at a maximum SCSI speed and width that is defined by the Ultra320 SCSI specification. LSI Logic provides the Message Passing Technology (MPT) Application Programmer Interface (API) to assist device driver programmers in establishing communications between the LSI Logic 1030T SCSI host adapter board and the personal computer hosting the LSI Logic 1030T SCSI host adapter board. The LSI Logic 1030T is a proprietary product of LSI Logic Corporation that is not available for consumer resale as the LSI Logic 1030T is utilized in the embodiment of the SCSI target simulator 200 illustrated here. LSI Logic Corporation is located at 1621 Barber Lane Milpitas, Calif. 95035, and may be contacted at phone number 866-574-5741, or on the Internet at www.l-silogic.com. The simulator SCSI host adapter board 206 does not need to be a LSI Logic 1030T SCSI host adapter board. The simulator SCSI host adapter board 206 may be any SCSI host adapter board that supports both SCSI initiator mode communications and SCSI target mode communications. To establish communications between the simulator host adapter board 206 and the simulator personal computer 202, an Application Programmer Interface (API) with similar functionality to the Message Passing Technology application programmer interface provided by LSI Logic may also be necessary. The simulator SCSI host adapter board 206 provides the physical connection to the SCSI communication bus 208 which carries the SCSI I/O of the simulated SCSI target devices. The SCSI communication bus 208 connects the simulator personal computer to a test SCSI host adapter system 210 utilizing the SCSI target simulator 200 for testing purposes.

The simulator personal computer is running a standard personal computer operating system 204. In the embodiment of the SCSI target simulator illustrated 200, the standard personal computer operating system 204 employed is a Microsoft Windows operating system 204. The preferred versions of the Microsoft Windows operating system 204 include: Windows NT, Windows 2000, and Windows XP. The simulator software running on the simulator personal computer 202 includes a simulator device driver 230 which is the primary software performing processes to simulate SCSI target devices. The simulator device driver 230 is a modified version of the standard device driver for the SCSI host adapter board 206. The simulator device driver 230 exploits the SCSI target mode communications of the simulator SCSI host adapter board 206 in order to simulate SCSI target devices. The SCSI target mode communications capability of the simulator SCSI host adapter board 206 is normally used to allow the simulator SCSI host adapter board 206 to identify itself on the SCSI communication bus 208, and allow the simulator SCSI host adapter board 206 to operate as a SCSI management device on the SCSI communication bus 208. The simulator device driver 206 expands the normal use of the SCSI target mode communications capability of the simulator SCSI host adapter board 206 to provide addressing and communications capabilities for one or more simulated SCSI target devices. The simulator device driver 230 further adds processes to the standard host adapter board device driver to simulate the operation of a variety of different types of SCSI target devices. The simulated SCSI target devices may be a hard disk drive, a CD-ROM drive, a CD-RW drive, a DVD-ROM drive, a DVD-RW drive, a magnetic tape drive, a scanner, a printer, a storage array device, or any other SCSI peripheral device.

The simulator device driver 230 communicates with the simulator SCSI host adapter board 206 over one internal communication channel 214 of the simulator host adapter board. There may be multiple communication channels 212, 214 for the simulator SCSI host adapter board 206. The 1030T SCSI host adapter board 206 illustrated has two communication channels 212, 214. The simulator device driver 230 supports target I/O communication 224 on all communication channels 212, 214 of the simulator host adapter board 206. For the Windows operating system 204, the simulator device driver supports each communications channel 212, 214 by creating a separate instance of the simulator device driver 230 for each communication channel 212, 214. For the LSI 1030T SCSI host adapter board 206 and the Windows operating system 204, communication I/O 224 between the simulator SCSI host adapter board 206 and the simulator device driver 230 is accomplished via the LSI Logic Message Passing Technology (MPT) application programmer interface. To assist the simulator device driver 230 SCSI target device simulation processes, the simulator device driver allocates Random Access Memory (RAM) of the simulator personal computer into a RAMDISK. A RAMDISK is means of utilizing RAM as if the RAM were a hard disk drive. There is a separate RAMDISK for each simulator host adapter board 206 communication channel 212, 214. The RAMDISK for each communication channel 212, 214 is further subdivided into a RAMDISK for each simulated SCSI target device utilizing the communication channel 212, 214.

The simulator device driver 230 does not require any other software on the simulator personal computer 202. For the Windows operating system 204, the simulator device driver 230 obtains configuration data 222 from the Windows registry 228 when the simulator personal computer 202 is booted. The configuration data may be manually entered into the Windows registry 228, but to make data entry easier a simulator Graphical User Interface (GUI) 226 is provided. The simulator GUI 226 provides a user friendly interface to enter and edit configuration data. The simulator GUI 226 both loads and sets the configuration data 218 within the Windows registry 228. The simulator GUI 226 also has the ability to save the configuration data to a configuration data file on the personal computer 202 hard disk, as well as the ability to load the configuration data from the previously saved configuration data file. To avoid unnecessary reboots of the simulator personal computer 202, the simulator GUI 226 also has the ability to update the simulator device driver 230 configuration settings at runtime by sending control commands 216 to the simulator device driver 230. The simulator GUI 226 is also used to command 216 the simulator device driver 230 to start monitoring the SCSI commands and SCSI task management commands so as to make the simulated SCSI target devices respond in a prescribed manner to specified SCSI commands and SCSI task management commands, referred to as SCSI event triggers. The simulator GUI 226 polls the simulator device driver 230 to retrieve operational data and processed or processing event trigger data 220 for the simulated SCSI target devices.

Figure 3:
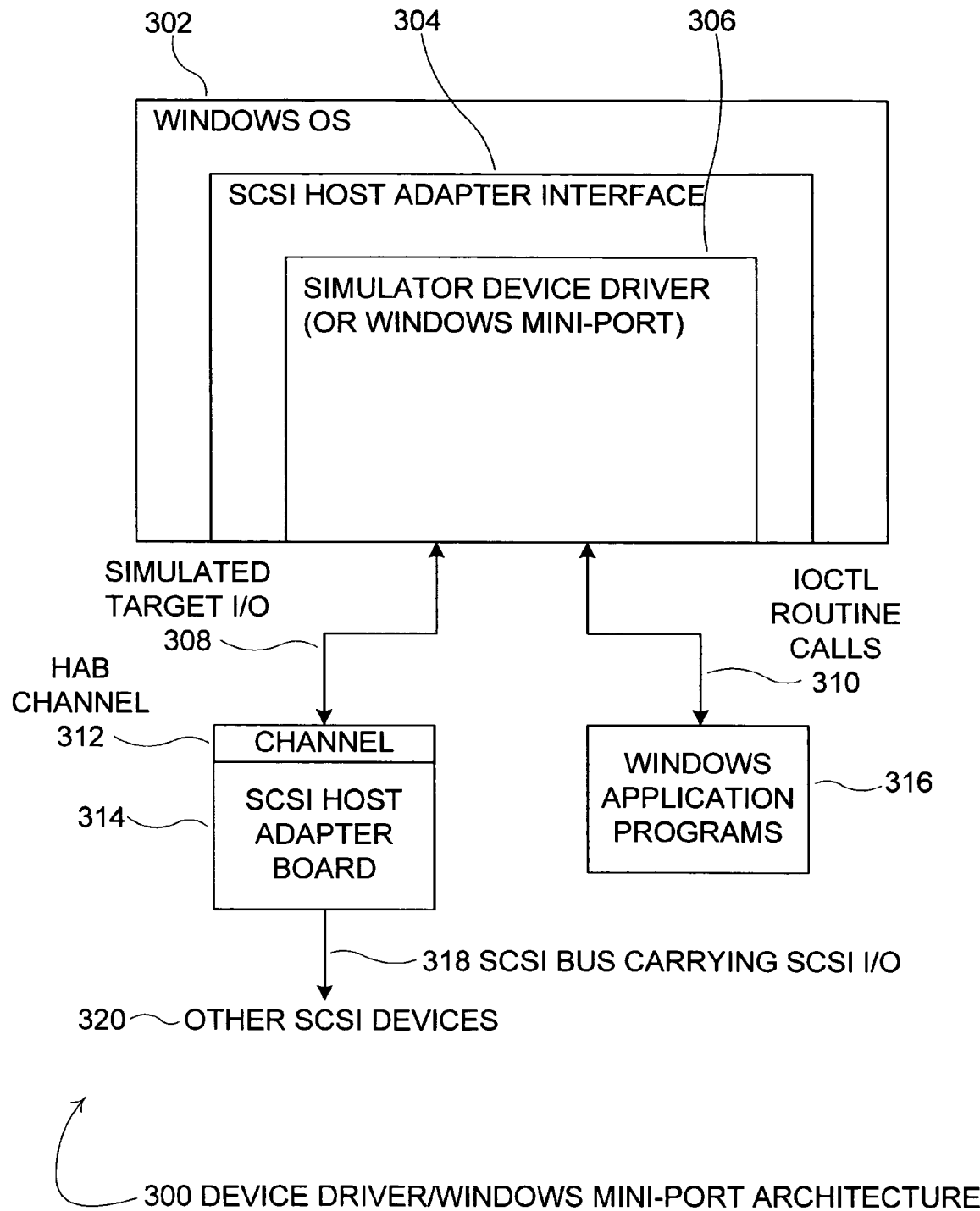
FIG. 3 is a schematic illustration of the Microsoft Windows device driver architecture.

FIG. 3 is a schematic illustration of the Microsoft Windows device driver architecture 300. The Windows operating system 302 employs a layered architecture for handling device drivers. For the SCSI target device simulator, the simulator device driver 306 communicates to SCSI adapter interface layer 304 that is the next layer up in the architecture. The SCSI adapter interface layer communicates up to the general Windows operating system layer 302, which integrates the device driver with other programs operating within the Windows operating system layer. There are other intermediate layers similar to the SCSI adapter interface layer 304 used to communicate with other types of peripheral hardware devices. The simulator device driver 306 communicates simulated SCSI target device I/O 308 with the SCSI host adapter board 314 by using the application programmer interface for the SCSI host adapter board 314 to connect with a specific communication channel 312 of the SCSI host adapter board 314. The SCSI host adapter board 314 then communicates the simulated SCSI target device I/O to the SCSI communication bus 318 where the requesting SCSI host adapter 320 can receive and respond to the simulated SCSI target device's I/O.

Figure 4:
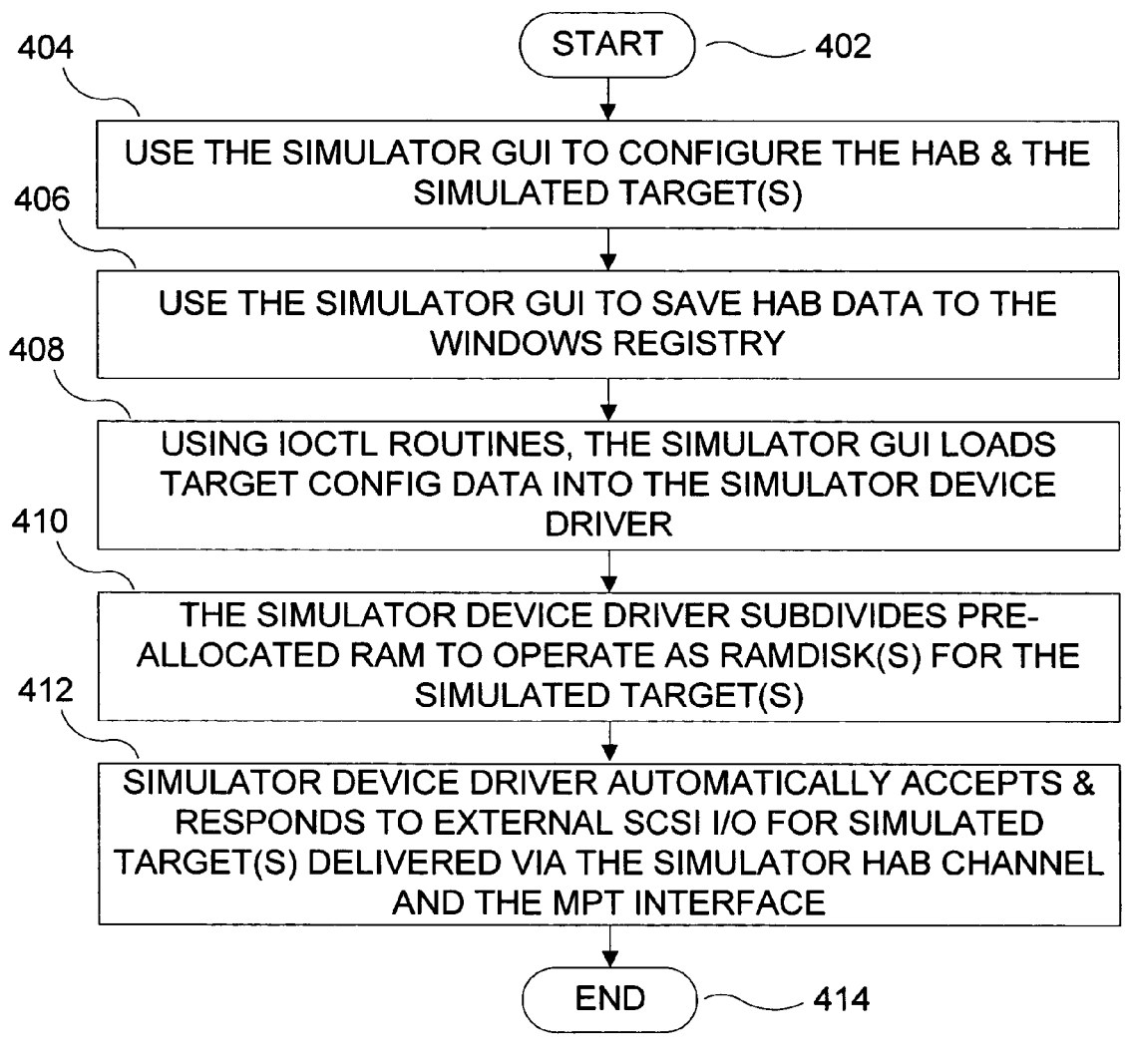
FIG. 4 is a flow chart describing the process involved in configuring and simulating SCSI target devices for an embodiment of a SCSI target device simulator.

FIG. 4 is a flow chart 400 describing the process involved in configuring and simulating SCSI target devices for an embodiment of a SCSI target device simulator. To start 402 using a SCSI target device simulator, the user must first use the simulator GUI to configure the simulator SCSI host adapter board parameters and the simulated SCSI target device parameters 404. The simulator SCSI host adapter board parameters include an initiator identification number, a channel RAMDISK size value, and a maximum transfer size value. The maximum transfer size value defines the maximum quantity of data allowed to be sent in a single SCSI communication burst. Adjusting the maximum transfer size to a small value is useful for testing purposes because the I/O remains outstanding for a much longer time since the SCSI target device simulator must disconnect and reconnect multiple times to complete a data transfer. All SCSI host adapter board parameters are individually defined for each communication channel of the simulator SCSI host adapter. The simulated SCSI target device parameters are likewise defined individually for each simulated SCSI target device. The simulated SCSI target device parameters include: the bus number defining which one of the communication channels of the simulator SCSI host adapter board the simulated SCSI target device will use for SCSI communication; the target identification number defining the address of the simulated SCSI target device; the Logical Unit Number (LUN) defining the sub-target address of the simulated SCSI target device if the simulated SCSI target device is part of a multi-LUN SCSI device (such as a disk 'jukebox' or a RAID system); the device type of the simulated SCSI target; the maximum negotiated parameters value which specifies the maximum standard SCSI speed and width of the simulated SCSI target device; the inquiry response value specifying the standard SCSI inquiry response the simulated SCSI target device should give for a SCSI inquiry command; the Enable Vital Product Data (EVPD) value which defines the simulator SCSI target device manufacturer data that is reported as a response to a SCSI EVPD query command; the drive size value which specifies the simulator SCSI target device drive size reported in response to a SCSI drive capacity query command; the Logical Block Addressing (LBA) sector size value which specifies the LBA sector size reported by the simulated SCSI target device in response to a SCSI drive capacity query command; and the post bus reset value which defines how the simulated SCSI target devices responds to a SCSI bus reset. The type of the simulated SCSI target device is selected from a list including: hard disk drive, CD-ROM drive, CD-RW drive, a DVD-ROM drive, DVD-RW drive, magnetic tape drive, a scanner, a printer, and storage array device. The simulated SCSI target device inquiry response is selected from a list including: 0x00 hex signifying a direct-access device, 0x01 hex signifying a sequential-access device, 0x02 hex signifying a printer device, 0x03 signifying a processor device, 0x04 hex signifying a write-once device, 0x05 hex signifying a CD/DVD device, 0x06 hex signifying a scanner device, 0x07 hex signifying an optical memory device, 0x08 hex signifying a medium changer device, 0x09 hex signifying a communications device, 0x0A hex signifying one type of a graphic arts pre-press device, 0x0B hex signifying a second type of graphics arts pre-press device, 0x0C hex signifying a storage array controller device, 0x0D hex signifying an enclosure services device, 0x0E hex signifying a simplified direct-access device, and 0x0F hex signifying an optical card reader/writer device.

Once the simulator SCSI host adapter board parameters and the simulated SCSI target device parameters are entered into the simulator GUI 404, the simulator GUI is used to save the SCSI host adapter board parameters to the Windows registry 406. The simulator GUI then uses IOCTL subroutines to load the simulated SCSI target device parameters into the simulator device driver 408. The simulator device driver then subdivides the pre-allocated RAM for the simulator host adapter channels into RAMDISKS for each simulated SCSI target device 410. The RAMDISKS are used to assist the simulator device driver simulation processes in simulating the SCSI target devices. The simulator device driver then automatically accepts and responds to external SCSI I/O for the simulated SCSI target devices 412. The SCSI I/O is delivered to the simulator device driver via a simulator host adapter board communication channel and the LSI Logic Message Passing Technology interface. To end 414, the simulator device driver is left running.

Figure 5:
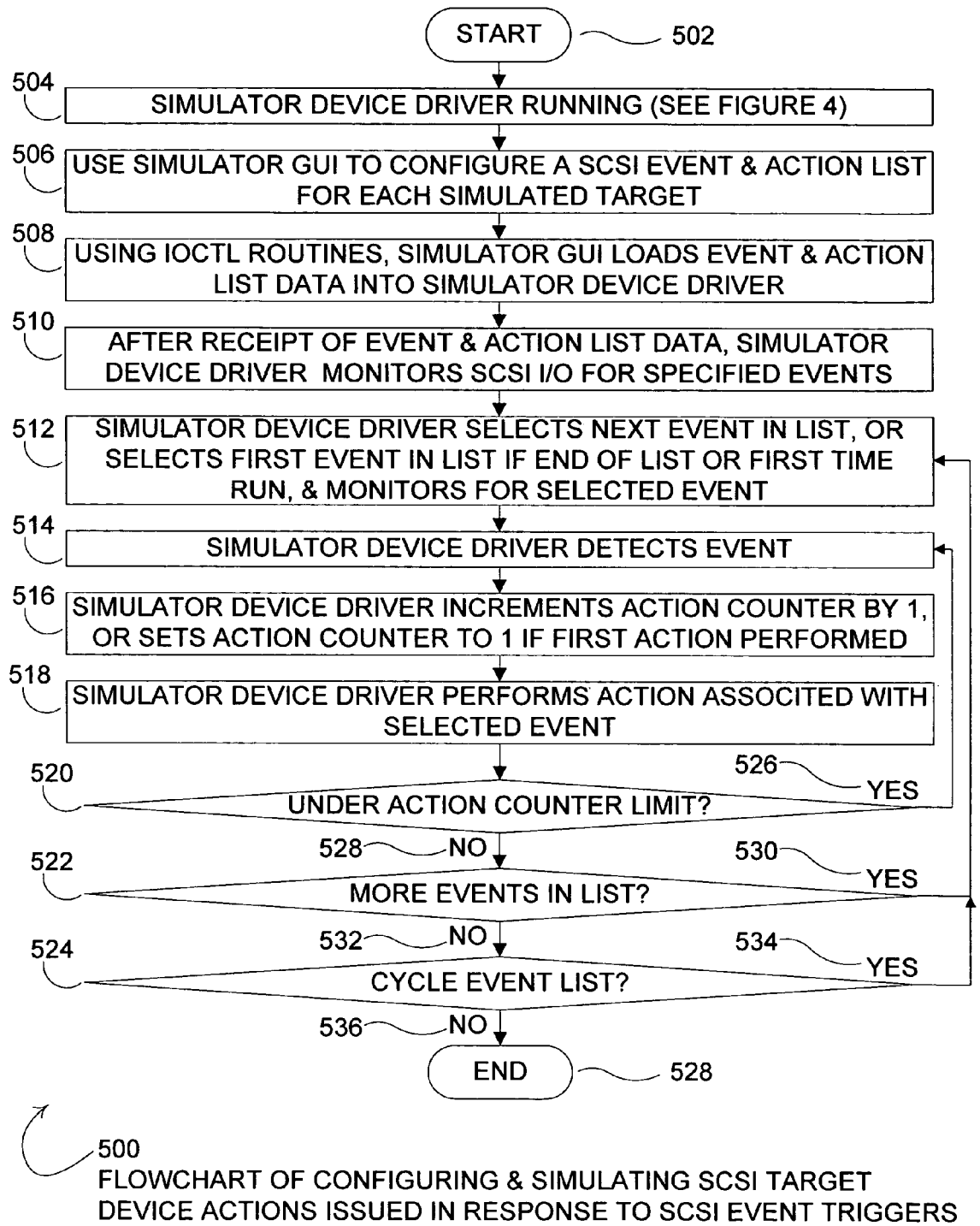
FIG. 5 is a flow chart describing the process involved in configuring and simulating SCSI target device actions issued in response to SCSI event triggers for an embodiment of a SCSI target device simulator.

FIG. 5 is a flow chart 500 describing the process involved in configuring and simulating SCSI target device actions issued in response to SCSI event triggers for an embodiment of a SCSI target device simulator. For each simulated SCSI target device there is a list of SCSI communication event triggers and associated actions for the simulated target device. A SCSI communication event trigger is a SCSI communication intended for the simulated SCSI target device. The possible SCSI communication event triggers include: any SCSI communication, any non-LBA SCSI communication, any LBA SCSI communication, a SCSI format command, a SCSI inquiry command, a SCSI read capacity command, a SCSI read command, a SCSI read buffer command, a SCSI read long command, a SCSI request sense command, a SCSI write command, a SCSI write buffer command, a SCSI write long command, a SCSI write and verify command, a SCSI seek command, a SCSI synchronize cache command, a SCSI TUR command, and a SCSI verify command. LBA SCSI communications include an LBA range to be accessed. In order to further limit LBA based SCSI communication event triggers a LBA range may be defined to specify that only SCSI communications accessing data in the specified LBA range are considered part of the SCSI communication event trigger. LBA based SCSI communication event triggers include: any LBA SCSI communication, the SCSI read command, the SCSI read long command, the SCSI write command, the SCSI write long command, the SCSI write and verify command, the SCSI seek command, and the SCSI verify command. When a SCSI event trigger is encountered the simulated SCSI target device can respond with either a state change action or a status change action. The possible state change actions include: halting the simulated SCSI target device before any data is transferred, halting the simulated SCSI target device after a small amount of data is transferred but before the SCSI status phase, halting the simulated SCSI target device after all data is transferred but before the SCSI status phase, reducing each data transfer by a small number of bytes (e.g., 4 bytes) in order to create a data underrun for SCSI read and SCSI write commands, and increasing each data transfer by a small number of bytes (e.g., 4 bytes) in order to create a data overrun for SCSI read commands. The possible status change actions include setting the simulator SCSI target device status to: a 0x00 hex signifying a good status, a 0x02 hex signifying a check condition status, a 0x04 hex signifying a condition met status, a 0x08 hex signifying a busy status, a 0x18 hex signifying a reservation conflict status, a 0x22 hex signifying a command terminated status, and a 0x28 hex signifying a queue full status. The 0x02 hex check condition status has additional parameters in the SCSI response, thus the 0x02 hex check condition status has additional configuration parameters including: a sense key, an Additional Sense Code (ASC) value that is a decimal value between 0 and 255, and an Additional Sense Code Qualifier (ASCQ) value that is a decimal value between 0 and 255. The sense key value is selected from one of the following values: a 0x00 hex signifying no sense, a 0x01 hex signifying recovered error, a 0x02 hex signifying not ready, a 0x03 hex signifying medium error, a 0x04 hex signifying hardware error, a 0x05 hex signifying illegal request, a 0x06 hex signifying unit attention, and a 0x07 hex signifying data protect.

To start 502 configuring SCSI communication event triggers and the associated actions, the simulator device driver must first be running as described by the description with respect to FIG. 4 (504). The simulator GUI is then used to configure a list of SCSI communication event triggers and an action associated with the SCSI communication event trigger 506. There is a separate SCSI communication event trigger and associated action list for each simulated SCSI target device. The simulator GUI, when requested to do so, then loads the SCSI communication event trigger and associated action data into the simulator device driver using Windows IOCTL subroutines 508. Once the SCSI communication event trigger and associated action data is completely loaded into the simulator device driver, the simulator device driver automatically begins monitoring the for the specified SCSI communication event triggers 510. For each simulated SCSI target device the simulator device driver selects the first SCSI communication event trigger and begins to monitor SCSI communications for the SCSI communication event trigger 512. When the SCSI communication event trigger is detected 514, the simulator device driver sets the repeat action counter to 1, because this is the first time an action will be performed 516. The simulator device driver then performs the action associated with the selected SCSI communication event trigger 518. The simulator device driver then determines if the repeat action counter is under the user configured repeat action count 520. If the repeat action counter is under the user configured repeat action count 526 the device simulator repeats the process of monitoring for, detecting, and responding to the selected SCSI communication event trigger. Once the selected SCSI communication event trigger is detected again 514, the simulator device driver increments the repeat action counter by 1 (516), and performs the action associated with the selected SCSI communication event trigger 516. The repeat action process of 514, 516, 518 and 520 is repeated until the repeat action counter is no longer under the repeat action count value 528. The simulator device driver then determines if there are any more SCSI communication event triggers in the event trigger list 522. If there are more SCSI communication event triggers in the event trigger list 530, the simulator device driver selects the next SCSI communication event trigger from the event trigger list 512, and repeats the monitor for SCSI communication event trigger process of 512, 516, 518, 520, and 522 until there are no more SCSI communication event triggers in the event trigger list 532. The device simulator then determines if the event trigger list is configured to cycle 524. If the event trigger list is configured to cycle 534, the event trigger list processing is repeated until the simulator device driver is halted. If the event trigger list is not configured to cycle 536, the event trigger list processing is ended 528.

The flowchart 500 disclosed in the description with respect to FIG. 5 describes an embodiment that sequentially monitors and processes the list of SCSI communication event triggers and associated actions. Another embodiment might perform the monitoring and processing of the list of SCSI communication event triggers and associated actions concurrently. The simulator device driver would monitor for each SCSI communication event trigger designated for concurrent processing in the event trigger list in parallel with the other designated SCSI communication event triggers in the event trigger list. There would be a separate simulator process flow equivalent to 512, 514, 516, 520 for each concurrently monitored SCSI communication event trigger. Each designated SCSI communication event trigger may be configured to respond to only the first occurrence of the SCSI communication event trigger, or to respond to all occurrences of the SCSI communication event trigger.

Figure 6:
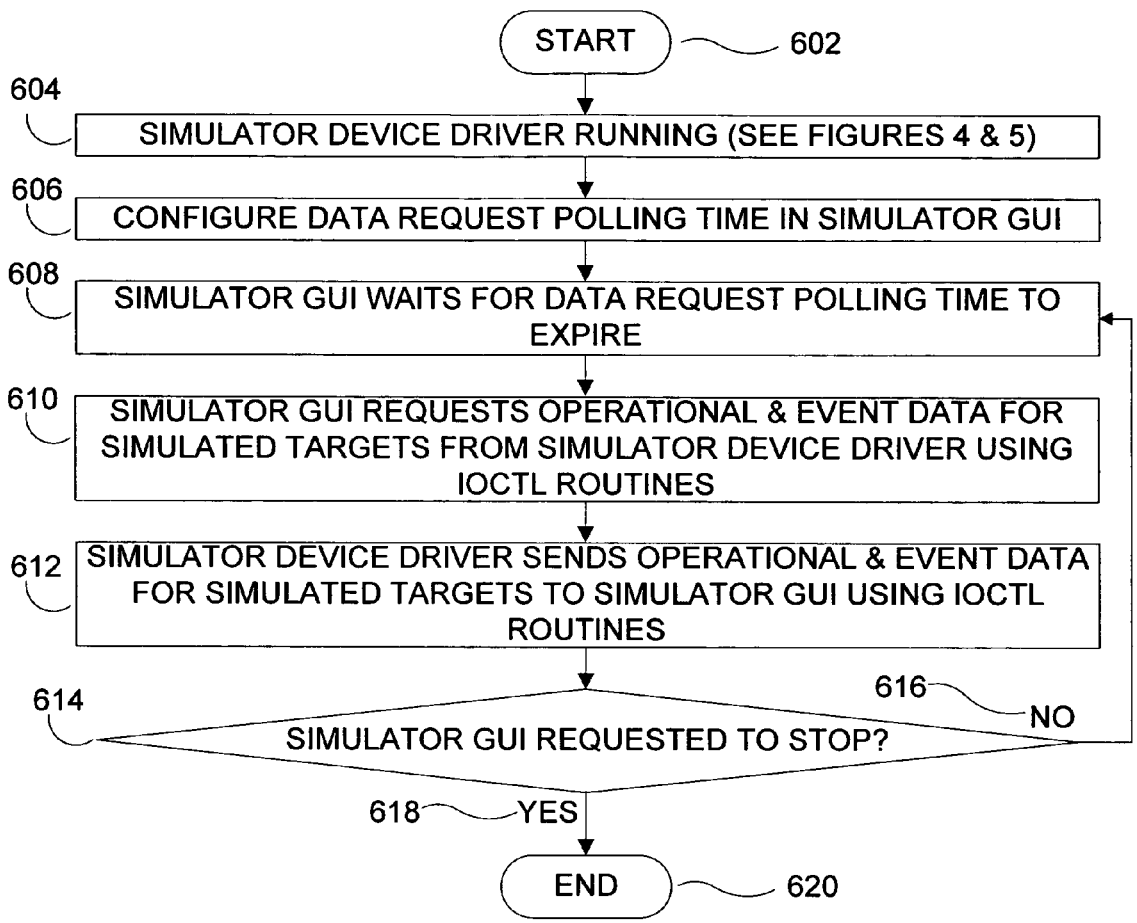
FIG. 6 is a flow chart describing the process involved in configuring and polling for simulated SCSI target device operational and event trigger data for an embodiment of a SCSI target device simulator.

FIG. 6 is a flow chart 600 describing the process involved in configuring and polling for simulated SCSI target device operational and event trigger data for an embodiment of a SCSI target device simulator. The simulator GUI may be configured to retrieve operational data and event trigger data from the simulator device driver. The operational and event trigger data are available for each simulated SCSI target device. The operational data for each simulated SCSI target device includes: the number of SCSI write commands received by the simulated SCSI target device, the quantity of data written to the simulated SCSI target device, the number of SCSI read commands received by the simulated SCSI target, and the quantity of data read from the simulated SCSI target device. The event trigger data applies to each event trigger that has been processed since the last time the simulator GUI requested event trigger data from the simulator device driver. The event trigger data includes: the count of repetitions of each processed external SCSI communication event trigger and associated action, and the raw LBA value of the external SCSI communication event trigger that caused the SCSI communication event trigger to be detected. Typically, the raw LBA value is only available if the SCSI communication event trigger is an LBA based SCSI communication event trigger and the associated action sets the status to check condition, thus, the simulator host adapter board is forced to issue a request sense command and the raw LBA data is then embedded within the returned request sense data.

To start 602 polling for operational and event trigger data, the simulator device driver must first be running as described by the description with respect to FIG. 4 and the description with respect to FIG. 5 (604). The user must first configure the data request polling time in the simulator GUI 606. The simulator GUI then waits for the data request polling time to expire 608. Once the polling time has expired the simulator GUI requests the operational and event trigger data from the simulator device driver 610. The simulator device driver sends the operational and event trigger data to the simulator GUI 612. All communication between the simulator GUI and the simulator device driver is performed with Windows IOCTL subroutines. The simulator GUI determines if there has been a request to stop the simulator GUI 614. If the simulator GUI has not been requested to stop 616 then the data request polling process of 608, 610, 612, and 614 is repeated until the simulator GUI is requested to stop 618, at which point the process ends 620.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A SCSI target device simulator for testing externally connected SCSI devices for proper operation in response to user configured SCSI target device simulator operation comprising:

a simulator host adapter board that is a standard SCSI host adapter board, said simulator host adapter board supporting both SCSI initiator mode and SCSI target mode communications on one or more communication channels of said simulator host adapter board, said communication channels sending and receiving SCSI communications to and from a personal computer containing said simulator host adapter board, said simulator host adapter board having an external SCSI cable connection for connecting said simulator host adapter board to a SCSI communications bus, said SCSI communications bus consisting of one or more SCSI cables connected to said externally connected SCSI devices, said externally connected SCSI devices sending and receiving said SCSI communications to and from said simulator host adapter board over said SCSI communications bus, and said simulator host adapter board having configurable simulator host adapter board parameters for specifying SCSI communication settings;

a simulator personal computer that is a standard personal computer, said simulator personal computer having an expansion slot that contains said simulator host adapter board, and said simulator personal computer having standard personal computer operating system software;

a simulator device driver that is a modified version of a standard host adapter board device driver for said simulator host adapter board, said simulator device driver modifying said standard host adapter board device driver to permit said simulator host adapter board SCSI target mode support to simulate the existence of one or more SCSI target devices, said simulator device driver supporting said SCSI communications on said communication channels of said simulator host adapter board that support both SCSI initiator mode communications and SCSI target mode communications;

user configurable simulated target device parameters that describe SCSI operational characteristics and a device type for each simulated target device of said simulated target devices;

a simulated device parameter input that accepts said user configurable simulated target device parameters;

user configurable responses for specific SCSI communications sent from said externally connected SCSI devices to said simulated target devices such that said simulated target devices are configured to respond to said externally connected SCSI devices with a specific user configured response for each specific SCSI communication received by said simulated target devices in order to test specific operational scenarios for said externally connected SCSI devices, said user configurable responses consist of both user configurable normal SCSI communications and user configurable flawed SCSI communications;

an user configured response input that accepts said user configurable responses for specific SCSI communications sent to said simulated target devices; and at least one SCSI target device simulator process that imitates said SCSI target devices as said simulated target devices in accordance with said user configurable simulated target device parameters and in accordance with said user configurable responses such that:
said simulated target devices do not physically exist;
said at least one SCSI target device simulator process automatically accepts and responds to a subset of said SCSI communications intended for said simulated target devices in order to test said externally connected SCSI devices for proper operation; and
said simulated target devices send said user configurable normal SCSI communications and said user configurable flawed SCSI communications in accordance with said specific user configured response for said specific SCSI communications in response to said specific SCSI communications sent from said externally connected SCSI devices and received by said simulated target devices.

2. The SCSI target device simulator of claim 1 wherein said simulator host adapter board is a LSI Logic 1030T SCSI host adapter board.

3. The SCSI target device simulator of claim 1 further comprising multiple simulator host adapter boards, each of said simulator host adapter boards being equivalent to said simulator host adapter board, said simulator personal computer further comprising multiple expansion slots containing said multiple simulator host adapter boards, said multiple expansion slots being sufficient in number so as each one of said multiple expansion slots contains one of said multiple simulator host adapter boards, and said simulator device driver further comprising support for concurrently sending and receiving said SCSI communications over all of said communication channels for all of said simulator host adapter boards.

4. The SCSI target device simulator of claim 1 wherein said simulator device driver allocates a portion of random access memory of said simulator personal computer into one or more channel ramdisks, each of said channel ramdisks is associated with a selected channel, said selected channel is one of said communication channels of said simulator host adapter board, said simulator device driver further subdivides said channel ramdisk into one or more simulated target device ramdisks, each of said simulated target device ramdisks is associated with one channel simulated target device so as to provide data storage capability for said channel simulated target device, said channel simulated target device being one of said simulated target devices that is configured to communicate over said selected channel.

5. The SCSI target device simulator of claim 1 wherein said simulator device driver is capable of accepting and responding to test SCSI communications generated by one or more test host adapter devices externally connected to said SCSI communications bus.

6. The SCSI target device simulator of claim 1 wherein said simulator device driver is capable of distinguishing simulator target device SCSI communications intended for said simulator target devices from real SCSI communications intended for real SCSI devices externally connected to said SCSI communications bus.

7. The SCSI target device simulator of claim 1 wherein said simulator host adapter parameters are defined separately for each communication channel of said communications channels, and said simulator host adapter parameters include an initiator identification number, a channel ramdisk size value, and a maximum transfer size value defining a maximum quantity of data allowed to be sent in a single SCSI communication burst.

8. The SCSI target device simulator of claim 1 wherein said simulated target device parameters are defined for each simulated target device of said simulated target devices and said simulated target device parameters include: a bus number defining one channel of said communication channels for sending and receiving said SCSI communications for said simulated target device, a target identification number for addressing said simulated target device, a logical unit number addressing a simulated sub-target device contained within said simulated target device, a target type for said simulated target device, a maximum negotiated parameters value specifying a maximum standard SCSI speed and width for said simulated target device, an inquiry response value defining a standard SCSI inquiry response to a SCSI inquiry command for said simulated target device, an enable vital product data value defining simulated target device manufacturer data reported as a response to a SCSI enable product data value query command for said simulated target device, a drive size value defining a drive size reported as part of a response to a SCSI drive capacity query command for said simulated target device, a logical block addressing sector size value defining a logical block addressing sector size reported as part of a response to a SCSI drive capacity query command for a simulated target device, and a post bus reset value defining post bus reset responses when said SCSI communications bus is reset for said simulated target device.

9. The SCSI target device simulator of claim 1 further comprising a simulator graphical user interface for entering and editing said simulator host adapter board parameters and said simulated target device parameters.

10. The SCSI target device simulator of claim 9 wherein said simulator graphical user interface sends said simulated target device parameters to said simulator device driver while said simulator device driver is running.

11. The SCSI target device simulator of claim 9 wherein said simulator graphical user interface has an ability to export said simulator host adapter board parameters and said simulated target device parameters to a simulator data file, and said simulator graphical user interface has an ability to import said simulator data file to restore previously entered simulator host adapter parameters and previously entered simulated target device parameters.

12. The SCSI target device simulator of claim 1 further comprising:
a list of external SCSI communication event triggers and associated actions for each simulated target device of said simulated target devices, said list of external SCSI communication event triggers and associated actions having an associated action linked with each external SCSI communication event trigger for each entry in said list, each said external SCSI communication event trigger being a specific SCSI communication message that may be received by said SCSI target device simulator from said external SCSI devices, said associated action being an action linked with each of said specific SCSI communication messages to be performed in response to said SCSI target device simulator receiving said specific SCSI communication message linked with said associated action;
an input to receive said list of external SCSI communication event triggers and associated actions; and
at least one event list handler process that progresses sequentially through said list of external SCSI communication event triggers and associated actions by processing each external SCSI communication event trigger and associated action of said list of external SCSI communication event triggers and associated actions in order from a first external SCSI communication event trigger and associated action to a last external SCSI communication event trigger and associated action, said event list handler process determining when to process an external SCSI communication event trigger and associated action by monitoring said external SCSI communications for said external SCSI communication event trigger and when said external SCSI communication event trigger is received responding with said associated action linked to said external SCSI communication event trigger in said list of external SCSI communication event triggers and associated actions.

13. The SCSI target device simulator of claim 12 wherein said event list handler process concurrently monitors for and processes in parallel multiple external SCSI communication event triggers and associated actions, said multiple external SCSI communication event triggers and associated actions being a subset of two or more of said list of external SCSI communication event triggers and associated actions.

14. The SCSI target device simulator of claim 12 wherein said external SCSI communication event trigger is detected by said event list handler process and said event list handler process responds with said associated action a configurable number of times before processing of said external SCSI communication event trigger and said associated action is considered complete.

15. The SCSI target device simulator of claim 12 wherein said event list handler process cycles back to said first external SCSI communication event trigger and associated action and processes said list of external SCSI communication event triggers and associated actions after each instance when said last external SCSI communication event trigger and associated action is completely processed.

16. The SCSI target device simulator of claim 12 wherein said external SCSI communication event trigger is one of the group comprising: any SCSI communication, any non-logical block addressing SCSI communication, any logical block addressing SCSI communication, a SCSI format command, a SCSI inquiry command, a SCSI read capacity command, a SCSI read command, a SCSI read buffer command, a SCSI read long command, a SCSI request sense command, a SCSI write command, a SCSI write buffer command, a SCSI write long command, a SCSI write and verify command, a SCSI seek command, a SCSI synchronize cache command, a SCSI TUR command, and a SCSI verify command.

17. The SCSI target device simulator of claim 16 wherein a logical block addressing external SCSI communication event trigger has an additional configuration parameter to define a logical block address range of a logical block addressing external SCSI communication event trigger monitored for by said simulator device driver, said logical block addressing external SCSI communication event trigger being one of the subgroup comprising: said any logical block addressing SCSI communication, said SCSI read command, said SCSI read long command, said SCSI write command, said SCSI write long command, said SCSI write and verify command, said SCSI seek command, and said SCSI verify command.

18. The SCSI target device simulator of claim 12 wherein said associated action is one of the group comprising: a state change action, and a status change action.

19. The SCSI target device simulator of claim 18 wherein said state change action is one of the group comprising: halting said simulated target device before any data is transferred, halting said simulated target device after a small amount of data is transferred but before SCSI status phase, halting said simulated target device after all data is transferred but before SCSI status phase, reducing each data transfer by a small number of bytes in order to create a data underrun for SCSI read and SCSI write commands, and increasing each data transfer by a small number of bytes in order to create a data overrun for SCSI read commands.

20. The SCSI target device simulator of claim 18 wherein said status change action is one of the group comprising: a 0x00 hex signifying a good status, a 0x02 hex signifying a check condition status, a 0x04 hex signifying a condition met status, a 0x08 hex signifying a busy status, a 0x18 hex signifying a reservation conflict status, a 0x22 hex signifying a command terminated status, and a 0x28 hex signifying a queue full status.

21. The SCSI target device simulator of claim 20 wherein said 0x02 hex signifying a check condition status is further defined by request sense information including a sense key value, an additional sense code value that is a decimal value between 0 and 255, and an additional sense code qualifier value that is a decimal value between 0 and 255.

22. The SCSI target device simulator of claim 12 further comprising a simulator graphical user interface for entering and editing said list of external SCSI communication event triggers and associated actions, said simulator graphical user interface loads said list of external SCSI communication event triggers and associated actions into said simulator device driver, and said simulator graphical user interface commands said event list handler process to start processing said list of external SCSI communication event triggers and associated actions.

23. The SCSI target device simulator of claim 22 wherein said simulator graphical user interface has an ability to export said list of external SCSI communication event triggers and associated actions to an event data file, and said simulator graphical user interface has an ability to import said event data file to restore a previously entered list of external SCSI communication event triggers and associated actions.

24. The SCSI target device simulator of claim 12 further comprising a simulator graphical user interface for observing the operation of said simulator device driver, said simulator graphical user interface retrieving simulated target operational data and completed external SCSI communication event trigger and associated action data from said simulator device driver at a configurable time interval, and said simulator graphical user interface externally displaying said simulated target operational data and said completed external SCSI communication event trigger and associated action data.

25. The SCSI target device simulator of claim 24 wherein said simulated target operational data is defined for each simulated target device of said simulated target devices and said simulated target operational data includes: a number of SCSI write commands received by said simulated target device, a quantity of data written to said simulated target device, a number of SCSI read commands received by said simulated target, and a quantity of data read from said simulated target device.

26. The SCSI target device simulator of claim 24 wherein said external SCSI communication event trigger and associated action data is defined for each simulated target device of said simulated target devices, and said external SCSI communication event trigger and associated action data is further sub-defined for each processed external SCSI event trigger and associated action of said list of external SCSI communication event triggers and associated actions processed since said simulator graphical user interface last requested said external SCSI communication event trigger and associated action data from said simulator device driver, and said external SCSI communication event trigger and associated action data includes: a count of repetitions of said processed external SCSI communication event trigger and associated action, and a raw logical block addressing value of said external SCSI communication event trigger.

27. A method for testing one or more external SCSI devices comprising the steps of:
- connecting said one or more external SCSI devices to a SCSI target device simulator that simulates one or more SCSI target devices as simulated target devices through a SCSI communications bus in order to obtain actual performance results of said external SCSI devices when interacting with said simulated target devices as said simulated target devices are configured to operate by a user;
- creating user configurable simulated target device parameters to describe SCSI operational characteristics and a device type for each simulated target device of said simulated target devices;
- creating user configurable responses for specific SCSI communications sent to said simulated target devices from said external SCSI devices such that said simulated target devices are configured to respond with a specific user configured response for each specific SCSI communication received by said simulated target devices in order to test specific operational scenarios for said external SCSI devices, said user configurable responses consist of both user configurable normal SCSI communications and user configurable flawed SCSI communications;
- imitating said SCSI target devices as said simulated target devices in accordance with said user configurable simulated target device parameters and in accordance with said user configurable responses such that said simulated target devices do not physically exist and said process of imitating said SCSI target devices further comprises:
  - automatically accepting and responding to a subset of said SCSI communications intended for said simulated target devices in order to test said externally connected SCSI devices for proper operation; and
  - sending said user configurable normal SCSI communications and said user configurable flawed SCSI communications in accordance with said specific user configured response for said specific SCSI communications in response to said specific SCSI communications sent from said external SCSI devices and received by said simulated target devices;
- observing operation of said external SCSI devices as said external SCSI devices interact with said simulated target devices to obtain said actual performance results of said external SCSI devices; and
- comparing said actual performance results for said external SCSI devices when interacting with said simulated target devices against expected performance results of said external SCSI devices when interacting with SCSI devices operating as said simulated target devices were configured to operate by said user in order to test said external SCSI devices for proper operation.

28. The method of claim 27 wherein said SCSI target device simulator connects to said SCSI target device simulator via one or multiple standard SCSI host adapter boards.

29. The method of claim 27 further comprising the steps of:
- creating a list of external SCSI communication event triggers and associated actions for each simulated target device of said simulated target devices, said list of external SCSI communication event triggers and associated actions having an associated action linked with each external SCSI communication event trigger for each entry in said list, each said external SCSI communication event trigger being a specific SCSI communication message that may be received by said SCSI target device simulator from said external SCSI devices, said associated action being an action linked with each of said specific SCSI communication messages to be performed in response to said SCSI target device simulator receiving said specific SCSI communication message linked with said associated action;
- progressing sequentially through said list of external SCSI communication event triggers and associated actions from a first external SCSI communication event trigger and associated action to a last external SCSI communication event trigger and associated action such that a current external SCSI communication event trigger and associated action is selected in order from said list;
- determining when to process said current external SCSI communication event trigger and associated action by monitoring said external SCSI communications for said current external SCSI communication event trigger;
- responding with said associated action linked to said external SCSI communication event trigger in said list of external SCSI communication event triggers and associated actions when said current external SCSI communication event trigger is received.

30. The SCSI target device simulator of claim 1 wherein said user configurable responses are configured such that said simulated target devices send said user configurable normal SCSI communications and said user configurable flawed SCSI communications that are not physically possible for real physically existing SCSI target devices.

31. The SCSI target device simulator of claim 1 wherein said simulator device driver expands addressing and communications capabilities of said SCSI target mode communications supported by said simulator host adapter board to support more than one of said simulated SCSI target devices.

* * * * *